United States Patent [19]

Kojima

[11] Patent Number: 5,337,268

[45] Date of Patent: Aug. 9, 1994

[54] PARTIAL MULTIPLIER SELECTOR FOR MULTIPLICATION CIRCUIT

[75] Inventor: Shingo Kojima, Tokyo, Japan

[73] Assignee: NEC Corporation, Tokyo, Japan

[21] Appl. No.: 940,318

[22] Filed: Sep. 3, 1992

[30] Foreign Application Priority Data

Sep. 4, 1991 [JP] Japan .................................. 3-223246

[51] Int. Cl.⁵ .............................................. G06F 7/52
[52] U.S. Cl. ..................................................... 364/760
[58] Field of Search ......................................... 364/760

[56] References Cited

U.S. PATENT DOCUMENTS 4,972,362 11/1990 Elkind et al. ........................ 364/760

Primary Examiner—Long T. Nguyen
Attorney, Agent, or Firm—Foley & Lardner

[57] ABSTRACT

The present invention simplifies a partial multiplier selector for a multiplication circuit using the Booth Algorithm. For this purpose, a partial multiplier selector according to the present invention comprises a multiplier register to store multiplier data, a plurality of partial multiplier selecting units comprising clocked inverters which divide the multiplier data stored in the multiplier register using the multiplication start signal and sequentially fetch them and control circuits comprising latch circuits which sequentially output the multiplication start signal to the partial multiplier selecting units with a delay of one clock using the clock signal.

7 Claims, 7 Drawing Sheets

FIG.5A
FIG.5B
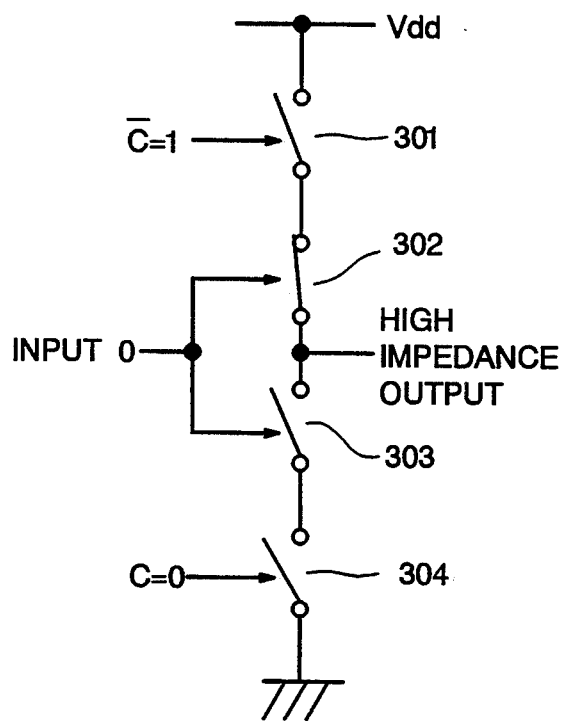
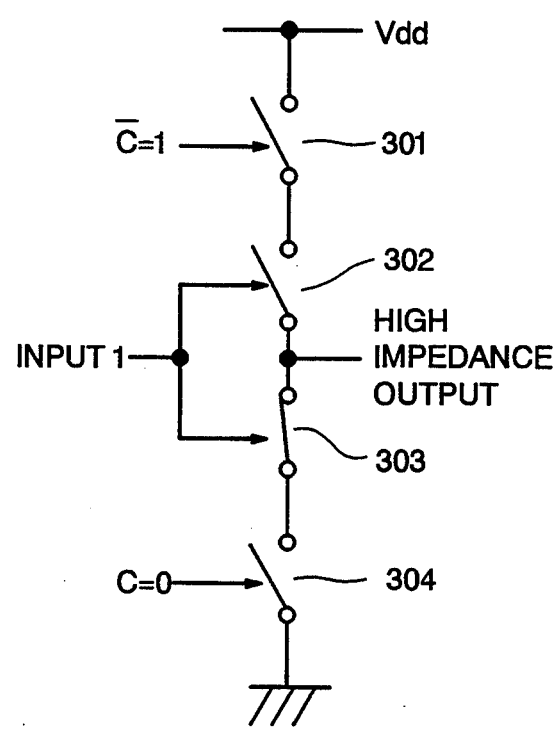

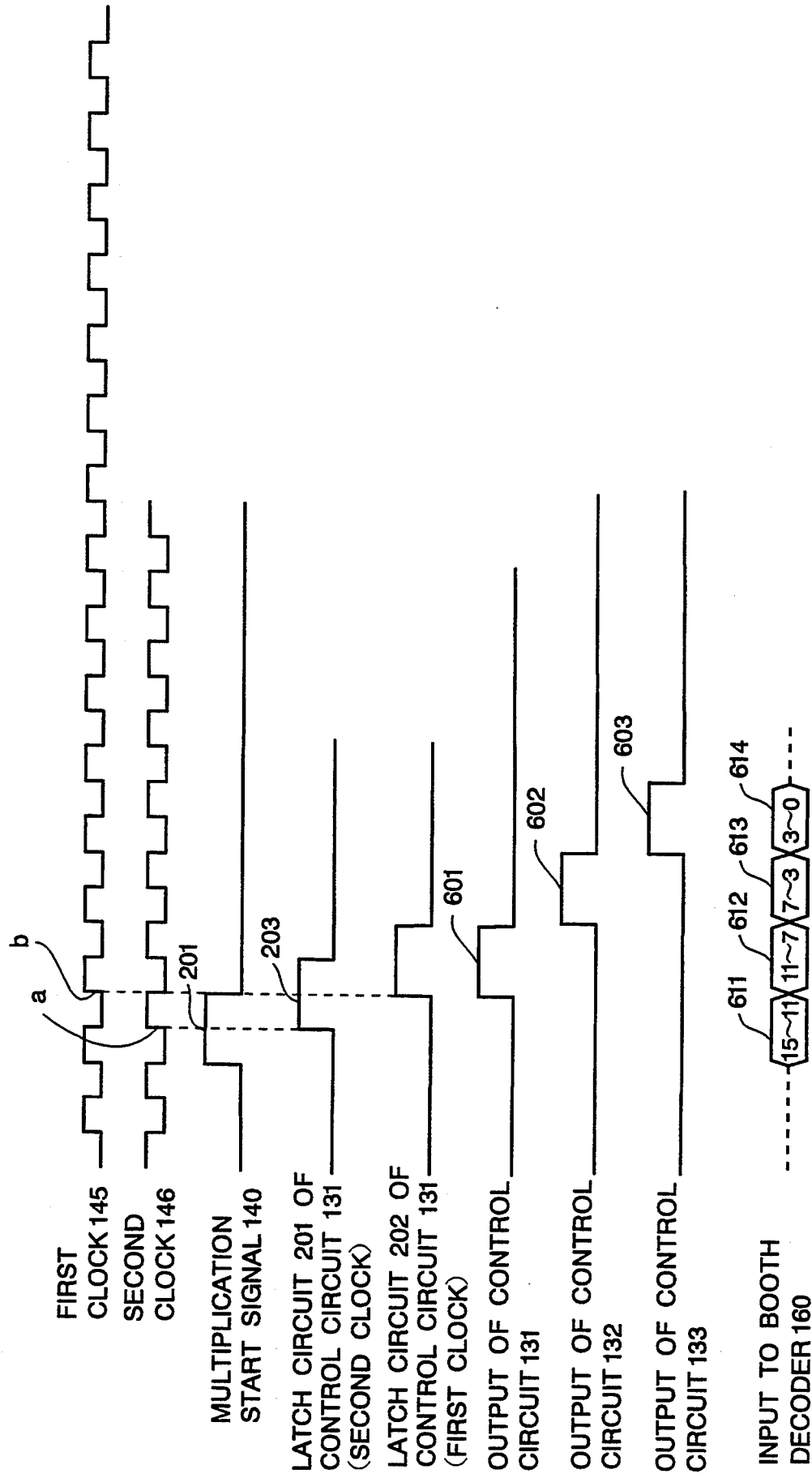

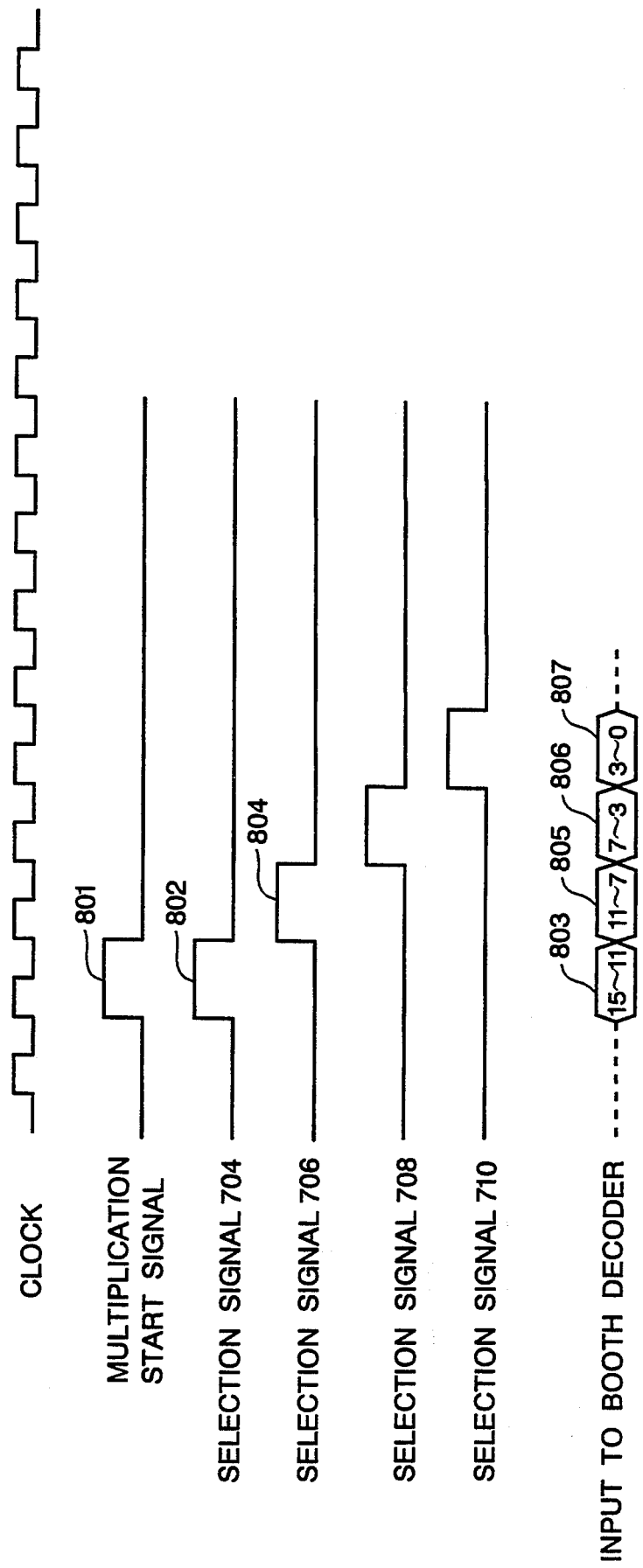

PARTIAL MULTIPLIER SELECTOR FOR MULTIPLICATION CIRCUIT

BACKGROUNDS OF THE INVENTION

1. Field of the Invention

This invention relates to an information processing device, and particularly to a partial multiplier selector for a multiplication circuit.

2. Description of the Prior Art

A multiplier device using the Booth Algorithm often divides the necessary multiplier into several partial multipliers, sequentially selects the partial multipliers and accumulates a plurality of partial products in order to save the hardware capacity. Conventionally, multiplexers have been used for such division and selection of multipliers, and the multiplication has been performed by sequentially activating the selection signal using a programmable controller.

FIG. 7 shows an example of a multiplier division/selection circuit using multiplexers. In this example, a 16 bit multiplier is divided into four partial multipliers and the partial multiplier data having a width of five bits are selected from four locations. The width of the partial multipliers are not four bits but five bits, because each divided partial multiplier must have one bit overlapping in the Booth Algorithm.

The reference numeral 701 indicates a multiplier register which stores 16 bits including a bit 0 located at the right end and a bit 15 located at the left end. The numeral 702 is a programmable controller, 703 is a multiplication start signal, 704 is a selection signal to select one of the bits 15 to 11 in the multiplier register 701, 705 is a reverse signal of the selection signal 704, 706 is a selection signal to select one of the bits 11 to 7 in the multiplier register 701, 707 is a reverse signal of the selection signal 706, 708 is a selection signal to select one of the bits 7 to 3 in the multiplier register 701, 709 is a reverse signal of the selection signal 708, 710 is a selection signal to select one of the bits 3 to 0 in the multiplier register 701 and a fixed value (=0), 711 is a reverse signal of the selection signal 710, 712 is a multiplexer which selects one of the bits 15, 11, 7 and 3 in the multiplier register 701, 713 is a multiplexer which selects one of the bits 14, 10, 6 and 2 in the multiplier register 701, 714 is a multiplexer which selects one of the bits 13, 9, 5 and 1 in the multiplier register 701, 715 is a multiplexer which selects one of the bits 12, 8, 4 and 0 in the multiplier register 701, 716 is a multiplexer which selects one of the bits 11, 7 and 3 in the multiplier register 701 and the fixed value, 717 is a Booth decoder to receive partial multipliers, 718 is a grounding component to provide the fixed value to the multiplexer 716, and 719 is a clock signal to operate the programmable controller 702.

The operation of the multiplier division/selection circuit in FIG. 7 is now described referring to the timing chart in FIG. 8. Firstly, a multiplier is stored in the multiplier register 701, and then the multiplication start signal 703 having a width of one clock is provided to the programmable controller 702 (801 in FIG. 8).

Synchronizing with this multiplication start signal 703, the selection signals 704 and 705 are issued by the programmable controller 702 (802). The remaining selection signals 706 to 711 are not activated and the selection signal 704 only becomes active for one clock. This activates the clocked inverter for bit 15 in the multiplexer 712 and the reversed value of the bit 15 in the multiplier register 701 is input to the Booth decoder 717.

Similarly, reversed values of the bits 14, 13, 12 and 11 in the multiplication register 701 are input from the multiplexers 713 to 716 to the Booth decoder 717 (803). The programmable controller 702 makes the selection signals 704 and 705 inactive in the next clock, and the selection signals 706 and 707 becomes active (804). These selection signals 706 and 707 cause the multiplexers 712 to 716 to provide the reversed values of the bits 11, 10, 9, 8 and 7 in the multiplier register 701 to the Booth decoder 717 (805).

In similar procedures, the programmable controller 702 issues the selection signals 708 and 709 and 710 and 711 with giving them intervals of one clock so that the reversed values of the bits 7 to 3 and 3 to 0 in the multiplier register 701 are sequentially input to the Booth decoder 717 (806, 807). The least significant bit of the five bits input to the Booth decoder 717 at the last must be fixed to zero in the Booth Algorithm, and the bits actually selected from the multiplier register 701 are only four (3 to 0).

A conventional multiplier device has used multiplexers for division and selection of partial multipliers as described above, and required so many programmable controllers and selection signal lines for selection of partial products, resulting in an enormous scale of hardware. Besides, if the multiplier device is to be realized on an LSI, complicated wiring from the multiplier register to multiplexers requires a large area for layout.

SUMMARY OF THE INVENTION

An object of the present invention is to provide a partial multiplier selector which can simplify the hardware and wiring and reduce the area for wiring when a multiplier device is to be realized on an LSI.

In a preferred embodiment of the present invention to attain the object, a partial multiplier selector comprises a storing means to store n bits of multiplier data (where n is an integer), m sets of selection means to divide the n bit multiplier data stored in the storing means into m groups (where m<n) and to sequentially fetch them using a selection signal, and m-1 control means to sequentially output the selection signal with a delay of one clock using a clock signal.

According to another preferred embodiment, the control means comprises a latch circuit to latch the selection signal using the clock signal. Further, the control means comprises a first latch circuit which latches the selection signal using a first clock signal and a second latch circuit located before the first latch circuit to perform latching using a second clock signal, which is the reverse signal of the first clock signal and to delay the output from the first latch circuit by one clock.

According to still another preferred embodiment, the selection means is provided with a plurality of clocked inverters corresponding to the bits of the multiplier data stored in the storing means, and such clocked inverter operates using the selection signal as the clock to fetch the multiplier data from the storing means. Preferably, the clocked inverter of the selection means uses the selection signal and its reverse signal as the clocks and comprises Complimentary Metal Oxide Semiconductor (CMOS) clock inverters which cause high impedance output when the selection signal is inactive.

According to still another preferred embodiment of the present invention, the selection means is provided for each bit of the multiplier data, fetches the multiplier data with operating according to the selection signal serving as the clock signal, and comprises a plurality of CMOS clock inverters which use the selection signal and its reverse signal as the clock signals and cause high impedance output when the selection signal is inactive; and the control means comprises a first latch circuit for selection signal latching using a first clock signal and a second latch circuit located before the first latch circuit, which latches using the second clock signal obtained by reversing the first clock signal so as to delay the output from the first latch circuit by one clock. In addition, the control means further comprises a third latch circuit to latch the reverse signal of the selection signal using the first clock signal and supply the clock signal to the applicable CMOS clocked inverter and a fourth latch circuit located before the third latch circuit, which latches using the reverse signal of the first clock signal so as to delay the output from the third latch circuit by one clock.

Other objects, characteristics and effects of the present invention will be clarified in the following description in details.

BRIEF DESCRIPTION OF THE DRAWINGS

FIGS. 5A and 5B provide a model diagram to illustrate the operation of the clocked inverter shown in FIG. 3;

FIG. 6 is a timing chart to illustrate the operation of the partial multiplier selector according to an embodiment of the present invention;

FIG. 7 is a block diagram to show the configuration of a conventional partial multiplier selector and FIG. 8 is a timing chart to illustrate the operation of the conventional partial multiplier selector shown in FIG. 7.

DESCRIPTION OF THE PREFERRED EMBODIMENT

Figure 1:
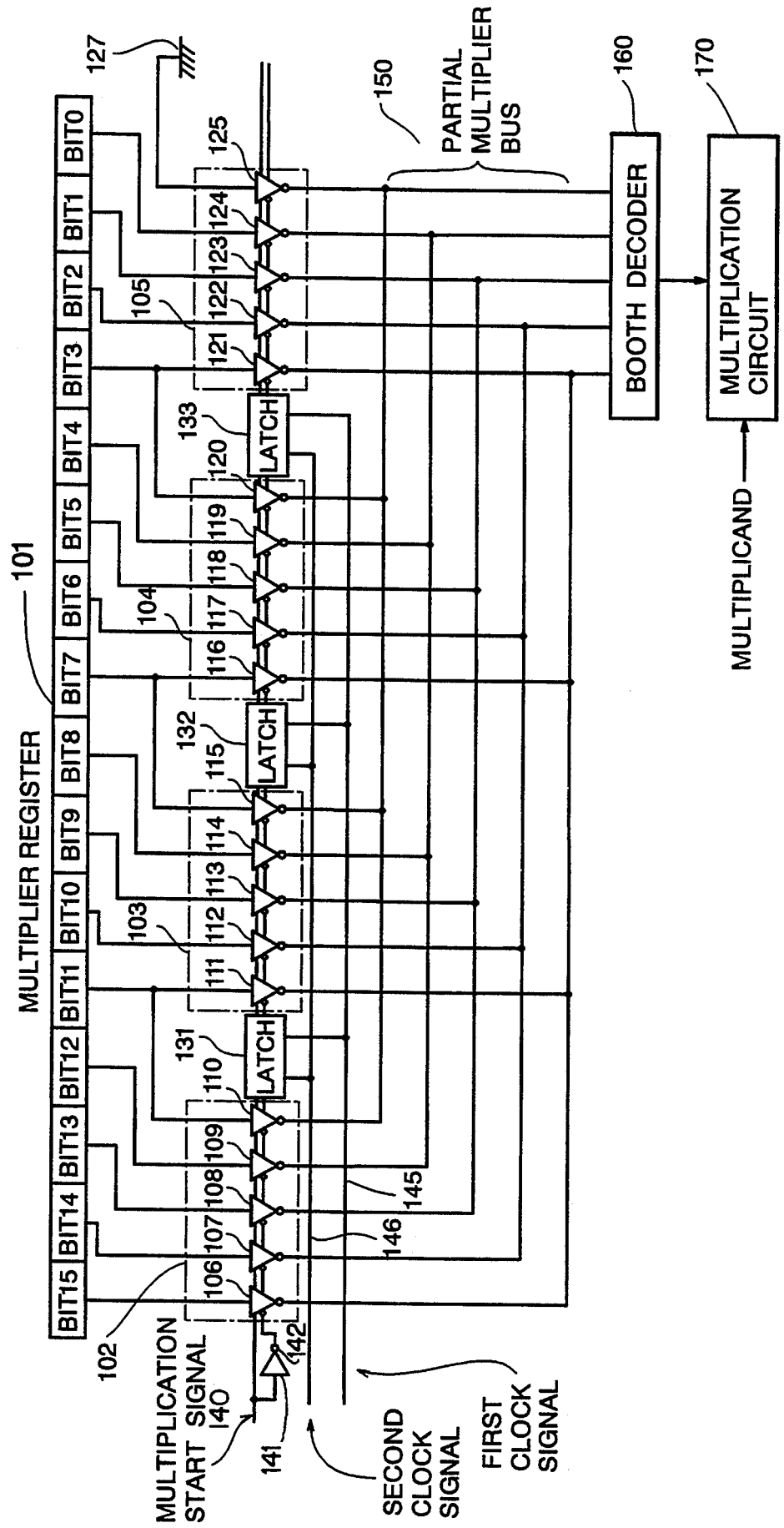
FIG. 1 is a block diagram to show the configuration of a partial multiplier selector according to an embodiment of the present invention.

Referring to the attached figures, a partial multiplier selector according to an embodiment of the present invention will be described below. FIG. 1 is a block diagram to show the configuration of a partial multiplier selector according to an embodiment of the present invention. In this embodiment, a 16 bit multiplier is divided into four so as to obtain partial multiplier data having a width of five bits and these partial multiplier data are sequentially selected.

A partial multiplier selector of this embodiment comprises a multiplier register 101 to store multipliers, partial multiplier selecting units 102, 103, 104 and 105 to select and fetch the necessary partial multiplier data from the multiplier register 101, control circuits 131, 132 and 133, a partial multiplier bus 150 to output five bit partial multiplier data fetched by the partial multiplier selecting units 102 to 105, and a Booth decoder 160 to receive the partial multiplier data output via the partial multiplier bus 150 and to output the data to the multiplication circuit 170.

The multiplier register 101 is a 16 bit multiplier register. The least significant bit stored at the right end of this multiplier register 101 is referred to as the bit 0 and the most significant bit at the left end is referred to as the bit 15.

Partial multiplier selecting units 102, 103, 104 and 105 are circuits to divide 16 bit multiplier data stored in the multiplier register 101 into four and to fetch them as partial multipliers having a width of 5 bits. The partial multiplier selecting unit 102 comprises five clocked inverters 106 to 110, the partial multiplier selecting unit 103 comprises five clocked inverters 111 to 115, the partial multiplier selecting unit 104 comprises five clocked inverters 116 to 120, and the partial multiplier selecting unit 105 comprises five clocked inverters 121 to 125. To the partial multiplier selecting units 102 to 105, a multiplication start signal 140 and its reverse signal 142 obtained by reversing the multiplication start signal 140 with an inverter 141 are input. Input of this multiplication start signal 140 causes the partial multiplier data to be fetched from the multiplier register 101.

Since divided partial multipliers are required to have an overlapped part of one bit in the Booth Algorithm, each partial multiplier has five bits, instead of four bits. In the present invention, the partial multipliers divided into four are made to have five bits as shown in the figure: the clocked inverter 110 at the fifth bit of the partial multiplier selecting unit 102 is overlapped with the clocked inverter 111 of the partial multiplier selecting unit 103, the clocked inverter 115 at the fifth bit of the partial multiplier selecting unit 103 with the clocked inverter 116 of the partial multiplier selecting unit 104, and the clocked inverter 120 at the fifth bit of the partial multiplier selecting unit 104 with the clocked inverter 121 of the partial multiplier selecting unit 105. The least significant bit (fifth bit) of the partial multiplier selecting unit 105 is connected with the grounding 127 as shown in the figure so that it has a fixed value of 0, since it is required to be fixed to zero in the Booth Algorithm.

Control circuits 131, 132 and 133 are respectively provided between two of the partial multiplier selecting units 102 to 105 as shown in the figure. The control circuits 131, 132 and 133 latch the above mentioned multiplication start signal 140 using a first clock signal 145 and a second clock signal 146. Specifically, the control circuit 131 outputs the multiplication start signal 140 to the partial multiplier selecting unit 103 with a delay of one clock, the control circuit 132 outputs the multiplication start signal 140 output to the partial multiplier selecting unit 103 to the partial multiplier selecting unit 104 with a delay of one more clock, and the control circuit 133 outputs the multiplication start signal 140 output to the partial multiplier selecting unit 104 to the partial multiplier selecting unit 105 with a delay of still one more clock. The control circuits 131, 132 and 133 output zero in their initial status.

The first clock signal 145 and the second clock signal 146 used by the control circuits 131 to 133 are not overlapped each other. In other words, the second clock signal 146 is the reverse of the first clock signal 145.

Figure 2:
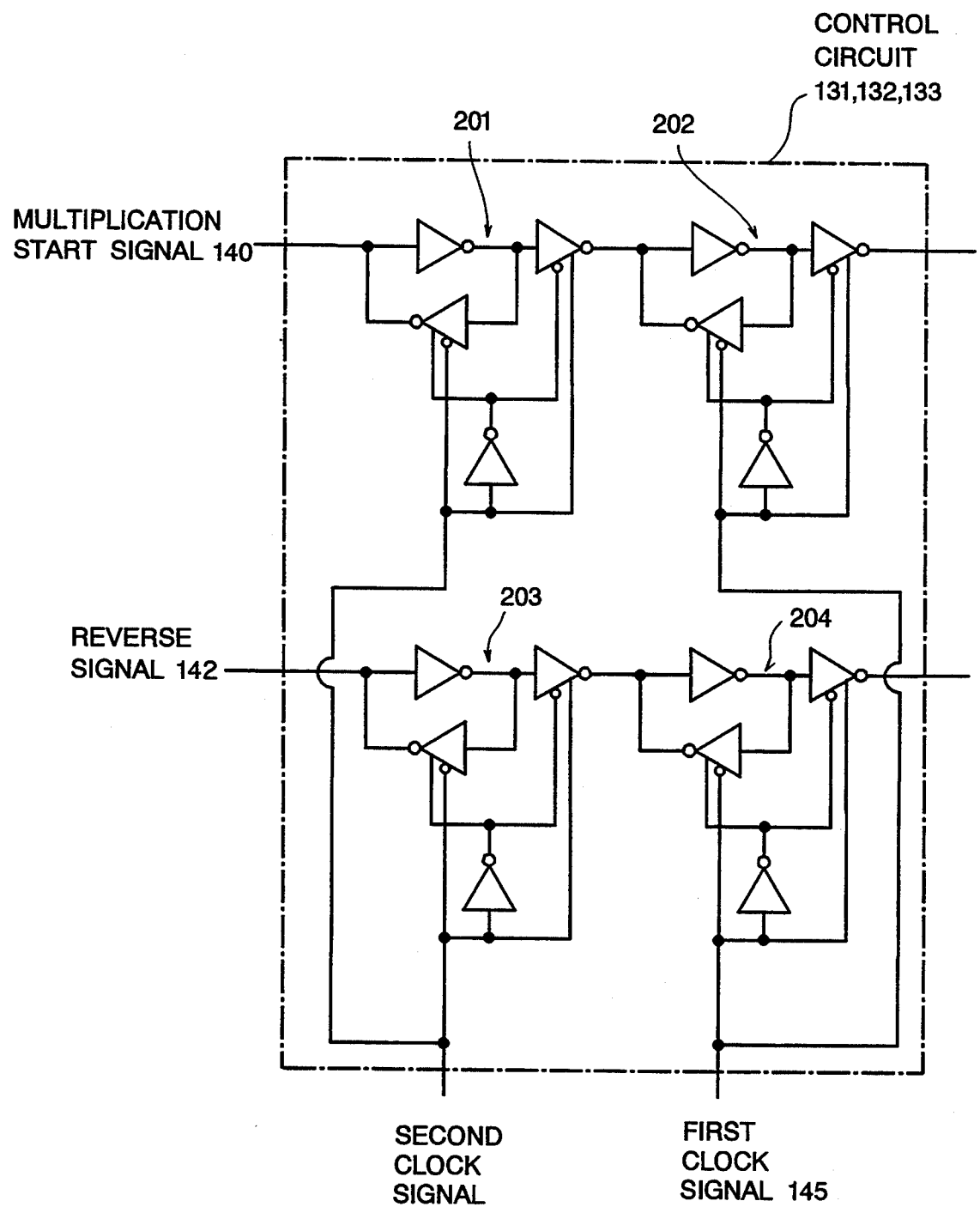
FIG. 2 is a block diagram to show a specific configuration example of the partial multiplier selector in FIG. 1.

FIG. 2 shows a specific configuration example of the control circuits 131, 132 and 133. This embodiment comprises a latch circuit using two stages of dynamic type latches provided with clocked inverters, in order to illustrate a circuit under two phase clock control. In FIG. 2, the dynamic type latches 201 and 202 on the upper two stages are used for the multiplication start signal 140 and the dynamic type latches 203 and 204 on the lower two stages are used for the reverse signal 142 of the multiplication start signal 140. The upper and lower dynamic type latches 201 and 203 at the first end receive the second clock signal 146 and the dynamic type latches 202 and 204 at the second end receive the first clock signal 145.

Figure 3:
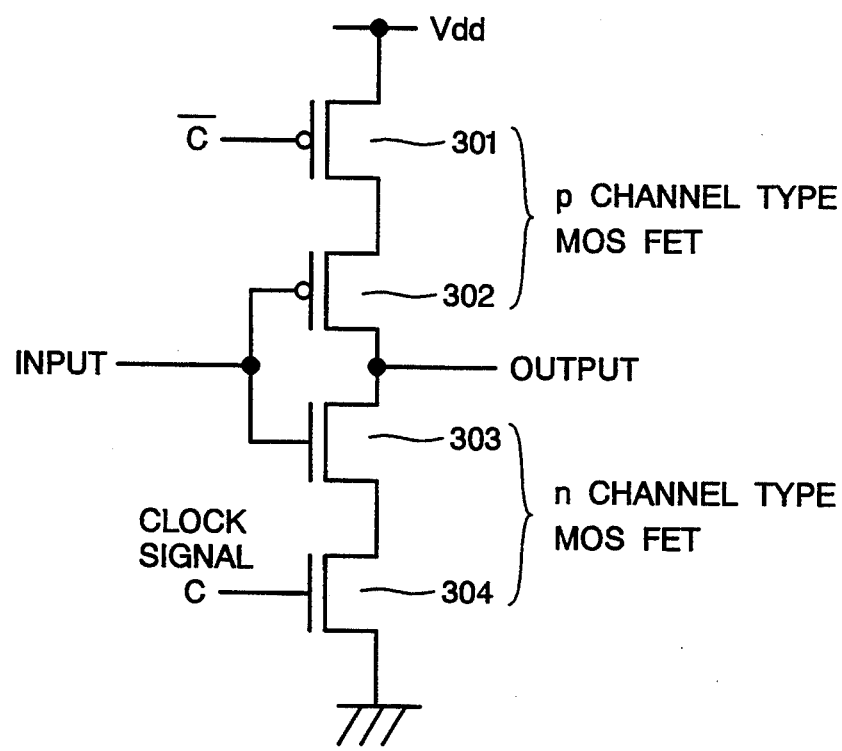
FIG. 3 is a schematic diagram to show a specific configuration example of a clocked inverter used in the partial multiplier selector of FIG. 1.

Here, the clocked inverters 106 to 125 used in the partial multiplier selecting units 102 to 105 are of CMOS (Complementary metal oxide semiconductor) type. FIG. 3 shows the specific configuration of such a CMOS type clocked inverter. The CMOS type clocked inverter comprises, as shown in the figure, two p channel type MOS FETs 301 and 302 and two n channel type MOS FETs 303 and 304. The multiplication start signal 140 is input to the gate of the n channel type MOS FET 304 as a clock signal C and the reverse signal 142, which is the reverse of the clock signal C is input as the clock signal to the gate of the p channel type MOS FET 301, as the clock signal. The input end is connected with the multiplier register 101 and the output end is connected with the partial multiplier bus 150 leading to the Booth decoder 160.

Figure 4A:
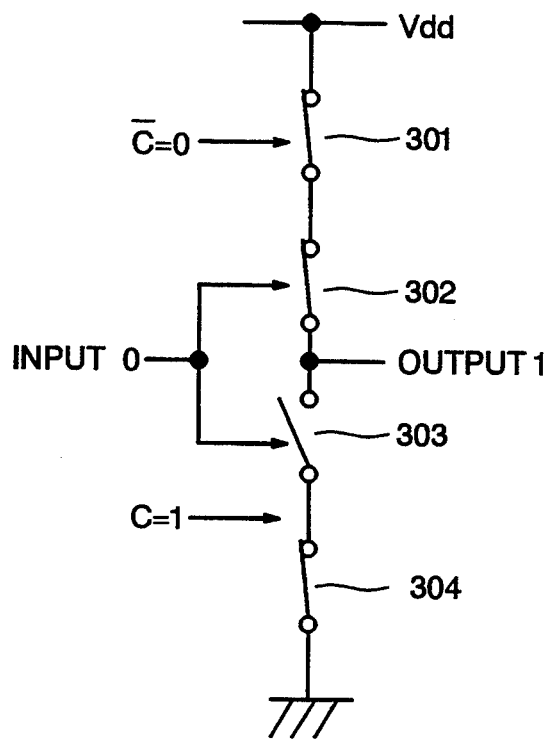
FIGS 4A and 4B provide a model diagram to illustrate the operation of the clocked inverter shown in FIG. 3.
Figure 4B:
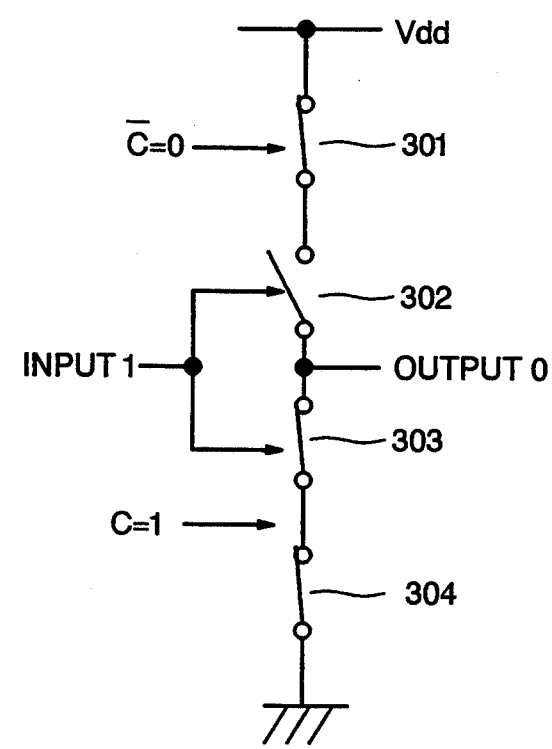
Figure 7:
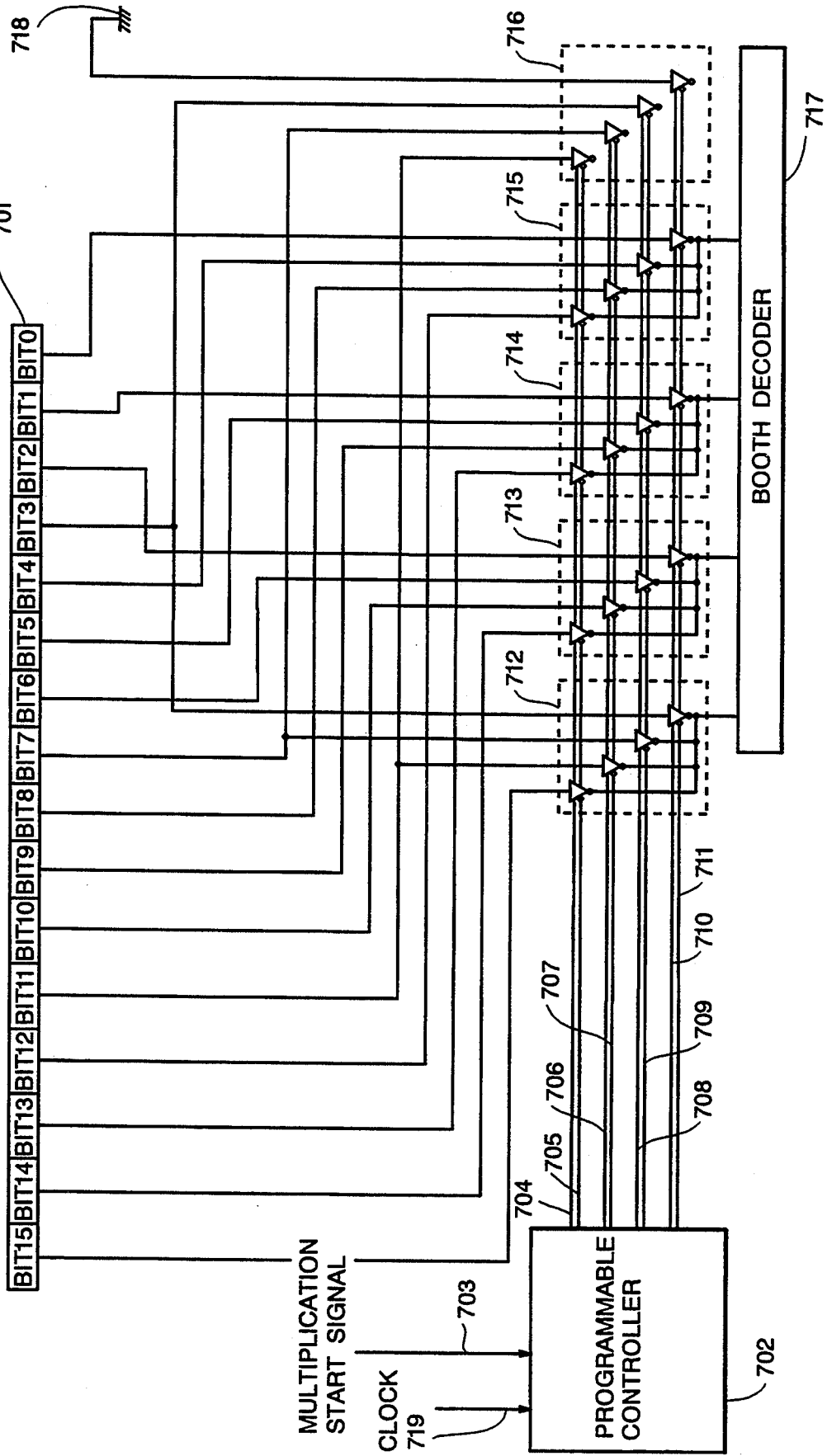

Referring to FIGS. 4A, 4B, 5A and 5B, the operation of the CMOS type clocked inverter is described now. For the sake of convenience, FIGS. 4A, 4B, 5A and 5B show a model where the MOS FETs 301 to 304 in FIG. 3 are replaced with switches. FIGS. 4A and 4B show the operation when the first clock signal 145 is at the high level (logical value: "1") and the second clock signal 146 is at the low level (logical value: "0"). In this case, input of a logical value "0" causes output of a logical value "1" as shown in FIG. 4A and input of a logical value "1" causes output of a logical value "0" as shown in FIG. 4B.

FIGS. 5A and 5B show the operation when the first clock signal 145 has a logical value "0" and the second clock signal 146 has a logical value "1". In this case, regardless of whether a logical value "0" or "1" is input, the output keeps high impedance status as shown in FIGS. 5A and 5B.

As described above, when using the first clock signal 145 and the second clock signal 146 (the reverse of the first clock signal 145) as clock signals, high impedance output can be obtained by causing the first clock signal 145 to have a logical value "0". Accordingly, even when outputs from a plurality of CMOS type clocked inverters are connected to a single bus (partial multiplier bus 150) as in the present embodiment, data contention does not occur.

In this invention, the inverter is not limited to a CMOS type clocked inverter. For example, N MOS type clocked inverter may be used. If N MOS type clocked inverters are used, control requires the first clock signal only with eliminating the need of the second signal (the reverse signal).

Referring now to the timing chart of FIG. 6, the division and selection operation for multipliers by the partial multiplier selector in this embodiment is described below.

Firstly, a multiplier having a length of 16 bits is stored in the multiplier register 101 and the multiplication start signal 140 having a width of one clock (one cycle of the clock signal) is input (201).

This multiplication start signal 140 becomes the selection signal for the multiplier register 101 as it is. It activates the clocked inverters 106 to 110 of the partial multiplier selecting unit 102 and provides the reversed values of the bits 15 to 11 in the multiplier register 101 onto the partial multiplier bus 150 having a width of five bits. The clocked inverters 111 to 125 of the remaining partial multiplier selecting units 103 to 105 are not activated because the control circuits 131, 132 and 133 are in the initial status with zero output. Therefore, data other than the bits 15 to 11 fetched by the partial multiplier selecting unit 102 do not enter the partial multiplier bus 150.

The Booth decoder 160 inputs the reversed values of the bits 15 to 11 in the multiplier register 101 sent from the partial multiplier bus 150 (611).

Next, at the rise "a" of the second clock signal 146, the latch circuit 201 at the first end of the control circuit 131 latches the multiplication start signal 140. When the multiplication start signal is thus latched by the latch circuit 201, the latch circuit 202 at the second end latches the multiplication start signal 140 at the rise "b" of the first clock signal 145. Accordingly, the output of the control circuit 131 becomes active one clock after the moment when the multiplication start signal 140 becomes inactive (601). Activation of the control circuit 131 activates the clocked inverters 111 to 115 of the partial multiplier selecting unit 103 and the reversed values of the bits 11 to 7 in the multiplier register 101 are loaded to the partial multiplier bus 150 having a width of five bits. Here, the clocked inverters 116 to 125 of the partial multiplier selecting units 104 and 105 are not activated since the control circuits 132 and 133 are in the initial status with zero output. Besides, the clocked inverters 106 to 110 of the partial multiplier selecting unit 102 are not activated either, since the multiplication start signal 140 becomes inactive again after one clock. Therefore, no data other than bits 11 to 7 enter the partial multiplier bus 150.

The Booth decoder 160 accepts the reversed values of the bits 11 to 7 in the multiplier register 101 sent from the partial multiplier bus 150 (612).

Similarly, the outputs from the control circuits 132 and 133 become active with a delay from the output of the above control circuit 131 by one clock for each (602 and 603). Accordingly, the clocked inverters 116 to 120 of the partial multiplier selecting unit 104 and the clocked inverters 121 to 125 of the partial multiplier selecting unit 105 are activated with a delay of one clock for each. The reversed values of bits 7 to 3 in the multiplier register 101 and the reversed values of the bits 3 to 0 are loaded to the partial multiplier bus 150 in this order and input to the Booth decoder 160 (613 and 614). Since the least significant five bits which are fetched by the partial multiplier selecting unit 105 and input to the Booth decoder 160 at the end need to be fixed to zero in the Booth Algorithm. Four bits only (bits 3 to 0) are actually selected from the multiplier register 101.

Thus, a five bit partial multiplier subjected to division is for every clock input to the Booth decoder 160, starting from the most significant bit.

Partial multiplier data from the Booth decoder 160 are provided to the multiplication circuit 170, which processes the multiplicand data and partial multiplier data to obtain partial products.

With the present invention, a conventional circuit comprising a programmable controller and a multiplexer can be reduced to an equivalent system using smaller number of hardware devices. In addition, wiring area can be substantially diminished, enabling easier arrangement of multiplier devices on an LSI.

Obviously many modifications and variations of the present invention are possible. It is intended to cover in the appended claims all such modifications as fall within the true spirit and scope of the invention.

What is claimed is:

1. A partial multiplier selector comprising:
   a storing means for storing n bits of multiplier data in which n is an integer,
   m sets of selection means for dividing the n bit multiplier data stored in said storing means into m groups of subset data, each of said m groups having one or more bits of data from within said multiplier data, in which $m < n$, and for sequentially fetching said m groups of subset data using a selection signal, and
   m-1 control means, each of said control means being connected between two of said m sets of selection means, each control means receiving said selection signal from one of said two selection means and outputting said selection signal to the other of said two selection means with a delay of one clock using a clock signal so that said m sets of selection means are operated sequentially for sequentially fetching said subset data.

2. A partial multiplier selector of claim 1 wherein said selection means is provided with a plurality of clocked inverters corresponding to the bits of the multiplier data stored in said storing means, such clocked inverter operating using said selection signal as the clock to fetch the multiplier data from said storing means.

3. A partial multiplier selector of claim 2 wherein said clocked inverter of said selection means uses said selection signal and its reverse signal as the clocks and comprises Complimentary Metal Oxide Semiconductor (CMOS) clock inverters which cause high impedance output when said selection signal is inactive.

4. A partial multiplier selector, comprising:
   a storing means for storing n bits of multiplier data in which n is an integer,
   m sets of selection means for dividing the n bit multiplier data stored in said storing means into m groups of subset data, each of said m groups having one or more bits of data from within said multiplier data, in which $m < n$, and for sequentially fetching said m groups of subset data using a selection signal, and
   m-1 control means, each of said control means being connected between two of said m sets of selection means, each control means receiving said selection signal from one of said two selection means and outputting said selection signal to the other of said two selection means with a delay of one clock using a clock signal so that said m sets of selection means are operated sequentially for sequentially fetching said subset data, wherein each of said control means comprises a latch circuit to latch said selection signal using said clock signal.

5. A partial multiplier selector of claim 4, wherein each latch circuit comprises:
   a first latch circuit section which latches the selection signal using a first clock signal; and
   a second latch circuit section located before the first latch circuit section to perform latching using a second clock signal, said second clock signal being a reverse signal of said first clock signal and to delay the output from the first latch circuit section by one clock.

6. A partial multiplier selector of claim 5 wherein at least one of said selection means is provided for each bit of said multiplier data to fetch the multiplier data according to said selection signal serving as the clock signal, each of said selection means comprises a plurality of Complimentary Metal Oxide Semiconductor (CMOS) clock inverters which use said selection signal and its reverse signal as the clock signals and cause high impedance output when said selection signal is inactive.

7. A partial multiplier selector of claim 6 wherein each latch circuit further comprises a third latch circuit section to latch the reverse signal of said selection signal using said first clock signal and supply the clock signal to the applicable CMOS clocked inventer and a fourth latch circuit section located before the third latch circuit section, which latches using the reverse signal of said first clock signal so as to delay the output from said third latch circuit by one clock.

* * * * *